US005761004A

United States Patent [19]

Peck

[11] Patent Number: 5,761,004
[45] Date of Patent: Jun. 2, 1998

[54] AIR BEARING SLIDER WITH OFFSET CROSSBARS TO REDUCE ROLL

[75] Inventor: Paul R. Peck, Santa Clara, Calif.

[73] Assignee: International Business Machines Corporation, Armonk, N.Y.

[21] Appl. No.: 753,811

[22] Filed: Dec. 2, 1996

[51] Int. Cl.⁶ ........................................... G11B 5/60
[52] U.S. Cl. ............................................. 360/103
[58] Field of Search ................................. 360/103

[56] References Cited

U.S. PATENT DOCUMENTS

| | | | |
|---|---|---|---|
| 4,218,715 | 8/1980 | Garnier | 360/103 |
| 4,636,894 | 1/1987 | Mo | 360/103 |
| 4,870,519 | 9/1989 | White | 360/103 |
| 5,210,666 | 5/1993 | Chapin et al. | 360/103 |
| 5,287,235 | 2/1994 | Cunningham et al. | 360/103 |
| 5,317,465 | 5/1994 | Chapin et al. | 360/103 |
| 5,377,063 | 12/1994 | Taniguchi et al. | 360/103 |
| 5,396,386 | 3/1995 | Bosna et al. | 360/103 |
| 5,430,591 | 7/1995 | Takeguchi et al. | 360/103 |
| 5,490,026 | 2/1996 | Dorius et al. | 360/103 |
| 5,513,056 | 4/1996 | Kawasaki et al. | 360/103 |
| 5,606,476 | 2/1997 | Chang et al. | 360/103 |
| 5,625,513 | 4/1997 | Utsunomiya et al. | 360/103 |
| 5,636,086 | 6/1997 | Bolasna et al. | 360/103 |

FOREIGN PATENT DOCUMENTS

| | | |
|---|---|---|
| 63 113989 | 5/1988 | Japan. |
| 3 125378 | 5/1991 | Japan. |

*Primary Examiner*—Robert S. Tupper
*Attorney, Agent, or Firm*—Ingrid M. Foerster; Monica D. Lee

[57] ABSTRACT

A negative pressure air bearing slider for use in carrying a transducer in a storage device exhibits reduced variation in roll when moving across a storage medium. In one embodiment, the slider includes an air bearing surface (ABS) having two negative pressure regions defined by a pair of side rails, a cross rail, and an angled rail extending from the cross rail and angled with respect to the longitudinal axis of the slider. Roll variation is reduced by shaping a portion of the cross rail to one side of the angled rail such that it has a larger positive pressure surface than the portion of the cross rail to the other side of the angled rail. The larger surface compensates for decrease in positive pressure on its side of the ABS attributable to increasing air skew angle. In a second embodiment, the slider ABS further includes a positive pressure pocket at the leading edge. Yet a third embodiment includes a debris deflecting protrusion extending from the cross rail in the direction of the leading edge. Optional modifications include angling one or both of the side rails, and extending the lengths of one or both side rails.

25 Claims, 8 Drawing Sheets

# AIR BEARING SLIDER WITH OFFSET CROSSBARS TO REDUCE ROLL

TECHNICAL FIELD

This invention relates generally to air bearing sliders for use with recording media and, more particularly, to a slider air bearing surface geometry having reduced roll resulting from skew as the slider travels across a storage medium.

BACKGROUND

Conventional magnetic data storage devices include a magnetic medium having a plurality of tracks for storing data, at least one read/write transducer for reading and writing data on the various tracks, an air bearing slider for supporting the transducer in close proximity to the media, a suspension for resiliently holding the slider and the transducer over the data tracks, and a positioning actuator connected to the suspension for moving the transducer across the media to the desired data track and maintaining the transducer over the data track during a read or a write operation. Examples of magnetic storage devices include magnetic disk drives and magnetic tape drives. Operating on similar principles are optical disk drives.

In magnetic recording technology, it is continually desired to improve the areal density at which information can be recorded and reliably read. Because the recording density of a magnetic storage device is limited by the distance between the transducer and the magnetic media, a goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk. In addition to achieving a small average spacing between the disk and the transducer, it is essential that a slider fly at a predictable and usually constant height despite the large variety of conditions it experiences during the normal operation of a disk drive. If the flying height is not constant, the data transfer between the transducer and the recording medium may be adversely affected.

Flying height is greatly dependent upon the geometry of the slider air bearing surface (ABS) which faces the storage medium. The air bearing surface provides the aerodynamic properties that influence slider behavior as the slider "flies" over the medium. These properties are determined by the number and shape of air bearing surfaces or rails providing positive pressure regions during flight. The slider generally includes a leading edge, where airflow enters the ABS, and a trailing edge, where it exits. In magnetic disk drives, sliders further include a hub-side nearest to the spindle, and a rim-side, nearest to the outer diameter.

Variations in fly height result when the slider is exposed to changing conditions as it moves from one region of the storage medium to another to access data. For example, the direction and/or speed of airflow across the slider ABS may vary, causing changes in positive pressure across the rails, and hence a corresponding rise or drop in fly height. One known method for reducing variations in air speed for a flatter fly height profile is to form at least one negative pressure region, e.g. in the form of a negative pressure pocket, in the ABS geometry. Examples of negative pressure sliders are provided in commonly assigned U.S. Pat. No. 5,396,386. The negative pressure pocket provides a force generally proportional to increasing air velocity to counteract positive pressure building on the rails. To assure that the negative pressure regions do not overcompensate for air speed, one or more leading edge pockets may be provided to reduce airflow into the negative pressure region(s). Commonly assigned U.S. Pat. No. 5,490,026 further describes this enhancement.

While negative pressure and leading edge pockets help to counteract variations in fly height resulting from changes in air speed, they do not specifically address variations resulting from changes in air direction. The positive pressure generated on an air bearing rail for a fixed air speed tends to be the greatest when the airflow is aligned with the longitudinal axis of the rail, i.e. at a zero skew angle. It also tends to decrease with increasing skew angle, causing a corresponding decrease in fly height. One method for reducing the effects of skew on fly height which is well suited to rotary actuator disk drives is to angle one or more ABS rails such that when the slider is located at the inner diameter (ID) of the disk (where air velocity is at a minimum), the one or more angled rails are aligned with the airflow. As the slider is moved toward the outer diameter (and air velocity increases), the skew angle increases and positive air pressure decreases. Thus the angled rails compensate for variations in air velocity by taking advantage of changes in the direction of air flow. As a result, positive pressure remains substantially constant, enabling an essentially constant flying height. Examples of slider rail configurations having angled features for improved fly height performance are shown in commonly assigned U.S. patent application Ser. No. 08/609, 737. Similar designs which further include contamination reducing features and are referred to as "tri-dent" ABS configurations are disclosed in related application Ser. No. 08/75383.

Even with the preceding features, a slider also experiences fly height variations due to roll. Roll is a measure of the angle formed between the plane of a recording medium and a plane holding the longitudinal and latitudinal axes of the slider. Roll may occur, for example, when the direction of airflow varies across the slider ABS, resulting in an uneven distribution of positive pressure across the ABS. Such variation is particularly notable in rotary actuator disk drives as the skew angle changes from a zero or near zero at the ID to a maximum value at the OD. Roll may also result from an asymmetrical ABS design that generates more positive pressure on one side of the slider than on the other. The phenomenon is exacerbated by high speed movement of the slider across the medium.

Both positive and negative pressure ABS designs tend to exhibit significant variation in roll from ID to OD. That is, the slider rolls in one direction at the ID and in the opposite direction at the OD. Roll in itself is undesirable, since it may cause catastrophic contact between the slider and the recording medium. For side-element designs, large variations in roll make it difficult to achieve a flat fly height profile across all radii of the disk. For center-element designs, large variations in roll reduce the minimum clearance between the slider and disk, increasing the chance of catastrophic contacts.

It is therefore apparent that the need exists for a negative pressure slider able to maintain a relatively uniform flying height and a minimum variation in roll from ID to OD in a storage device when exposed to variations in air speed and direction by providing an ABS with at least one angled rail and features to reduce roll variations across the recording medium.

SUMMARY OF THE INVENTION

The present invention is directed to an air bearing slider that satisfies this need by providing a slider with an ABS configuration including a negative pressure pocket formed by a cross rail and a pair of side rails, and at least one angled rail extending from the cross-bar. The thickness of the cross rail varies laterally across the ABS to provide differing amounts of positive pressure such that variations in slider roll with changing air speed and direction are reduced. In one embodiment, the air bearing geometry includes a leading edge pocket for reducing the amount of negative pressure generated in the trailing edge pocket. In another embodiment, the design includes a rail portion extending from the cross-bar through a leading edge pocket and toward the leading edge to channel debris away from the center of the slider.

DETAILED DESCRIPTION

Figure 1:
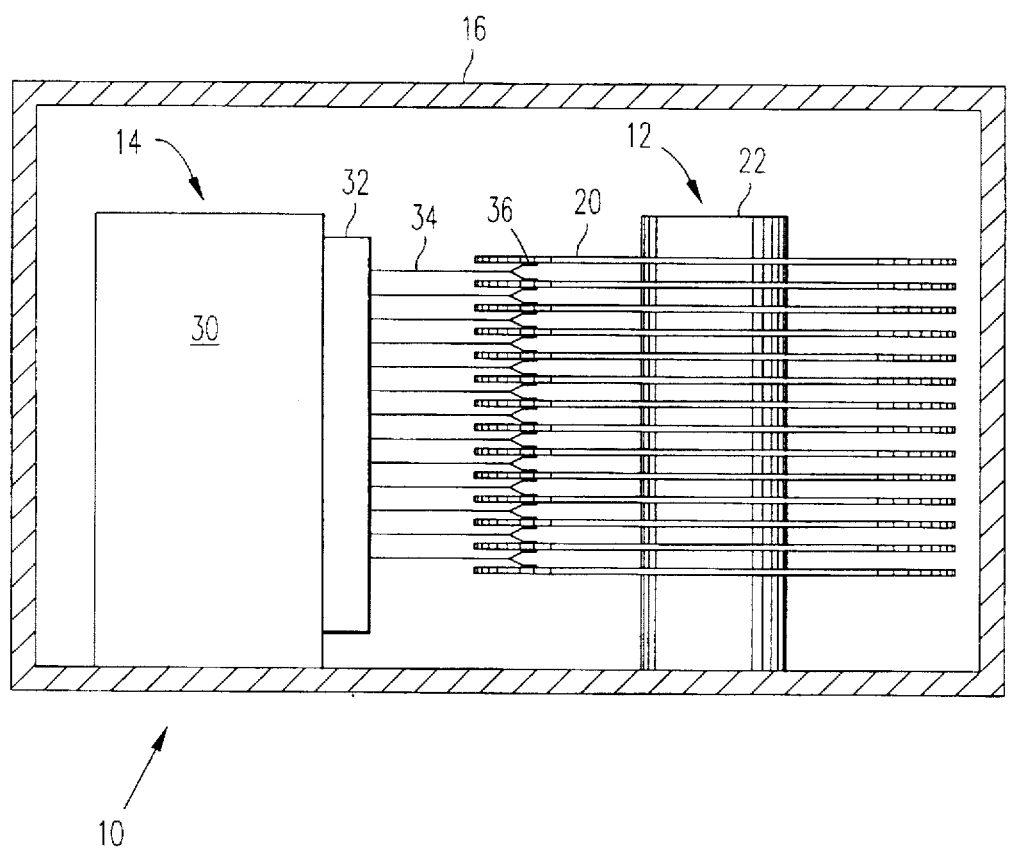
FIG. 1 is a schematic diagram of a disk drive system useful for practicing the present invention.

With reference to FIG. 1, a schematic diagram of a magnetic recording disk drive useful for practicing the present invention is illustrated. The system comprises a disk spindle assembly 12 and a head actuator assembly 14. Spindle assembly 12 and head actuator assembly 14 are located within a sealed housing 16 to prevent particulate contamination. Spindle assembly 12 comprises a plurality of magnetic recording disks 20 which are mounted to a spindle 22. Spindle 22 is rotated by an in-hub electrical motor which is not illustrated. Head actuator assembly 14 comprises a voice coil motor 30 which moves an actuator arm assembly 32 relative to the disks 20. Assembly 32 has a plurality of actuator arms 34, each of which is positioned in a space between two adjacent disks 20. Each actuator arm 34 has a pair of air bearing sliders 36 adapted for carrying read/write transducers adjacent to the disks 20. One read/write transducer flies adjacent to the disk positioned above the actuator arm 34 and the other flies adjacent to the disk positioned below the actuator arm 34.

In operation, spindle 22 is rotated by the in-hub motor and motor 30 moves the actuator arms 34 between the disks 20 to the desired track location. One of the read/write transducers attached to sliders 36 then reads or writes data on the desired track.

Figure 2:
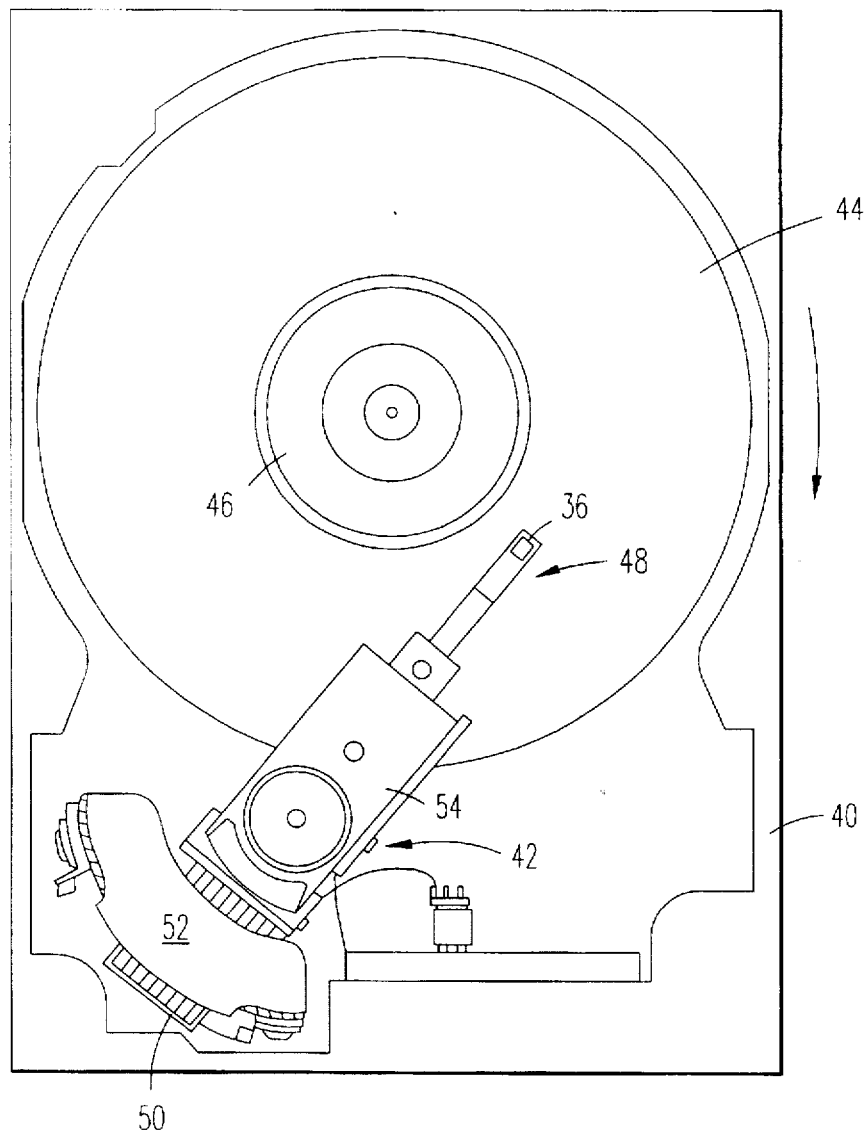
FIG. 2 is a top view of a disk drive with a rotary actuator useful in practicing the present invention.

Referring now to FIG. 2, a magnetic data recording disk drive useful for practicing the present invention is illustrated, although it shall be understood that the principles of the present invention may easily be applied to other storage devices having air bearing, near contact, or contact recording sliders. The disk drive includes a housing 40 in which is mounted a rotary actuator 42, an associated disk 44 and a drive means 46 for rotating the disk 44. The rotary actuator 42 moves a suspension assembly 48 in an arcuate path over the disk 44. The rotary actuator 42 includes a voice coil motor, which comprises a coil 50 movable within the magnetic field of a fixed permanent magnet assembly 52. An actuator arm 54 is attached to the movable coil 50. The other end of the actuator arm 54 is attached to the suspension assembly 48 which supports an air bearing slider 36 and its attached read/write transducer in a flying relationship adjacent to disk 44.

Figure 3A:
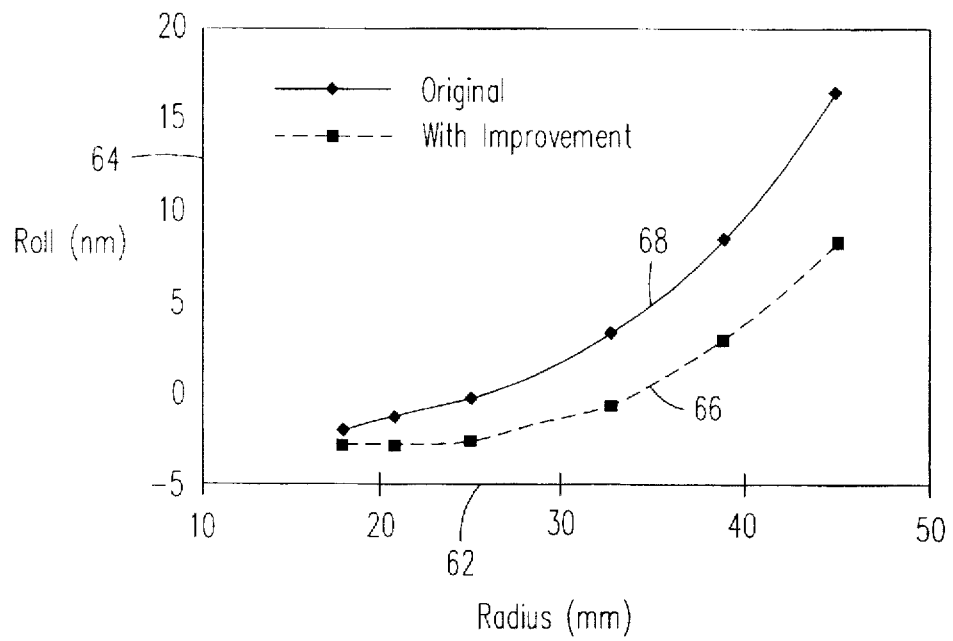
FIG. 3A is a graph of the roll profile of a slider moving across a storage medium.
Figure 3B:
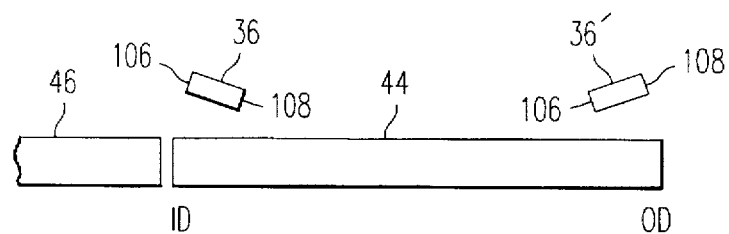
FIG. 3B illustrates a slider experiencing roll.

As the rotary actuator 42 sweeps the suspension assembly 48 across the disk 44, the slider 36 experiences variations in both airflow direction and linear velocity, causing an uneven distribution of air pressure across the slider air bearing surface. In response, slider 36 reacts to the pressure variations by rolling along its lateral axis. Curve 66 of FIG. 3A illustrates the amount of roll observed in an IBM 3.5 high performance disk drive having a rotational disk speed of 7200 RPM and a "trident" slider design. The horizontal axis 62 represents the radial position of the slider 36 in terms of increasing disk radius, and the vertical axis represents degree of roll in nanometers. Following curve 66, slider roll is initially negative when the slider is moving from the inner diameter (ID) toward the outer diameter (OD), thereafter becoming increasingly positive. Negative and positive roll may be understood by referring to FIG. 3B, which depicts the side-view of a portion of disk 44 and a portion of the hub 46. Also represented is a slider first positioned at the ID or hub (slider 36), and then positioned at the OD or rim (slider 36'). The side of the slider body nearest to the hub is referred to its hub side 106, and the side nearer to the rim is the rim side 108. For the purposes of the present specification, roll shall be defined by the relationship R-H, where R is the rim-side 108 fly height and H is the hub-side 106 fly height. Consequently, when the rim-side 108 of slider 36 is lower than its hub-side 106, R-H is negative and the slider is said to be experiencing negative roll. Conversely, when the hub-side 106 is lower, R-H is positive and the slider 36' is said to be experiencing positive roll.

Figure 4A:
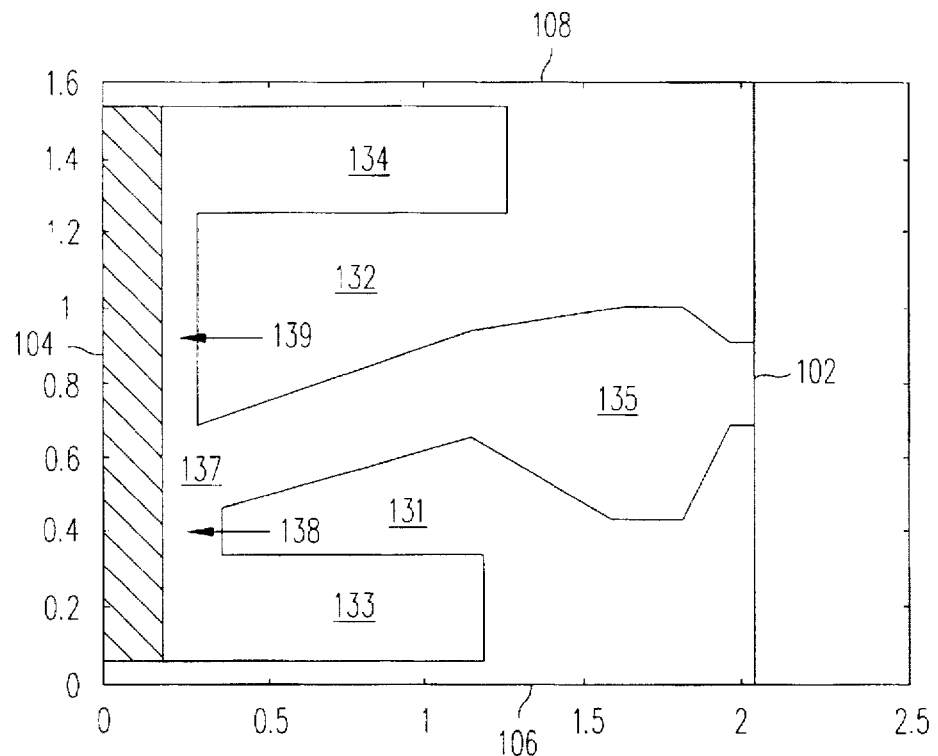
FIGS. 4A–4C are bottom plan views of air bearing slider configurations implementing the present invention.
Figure 4B:
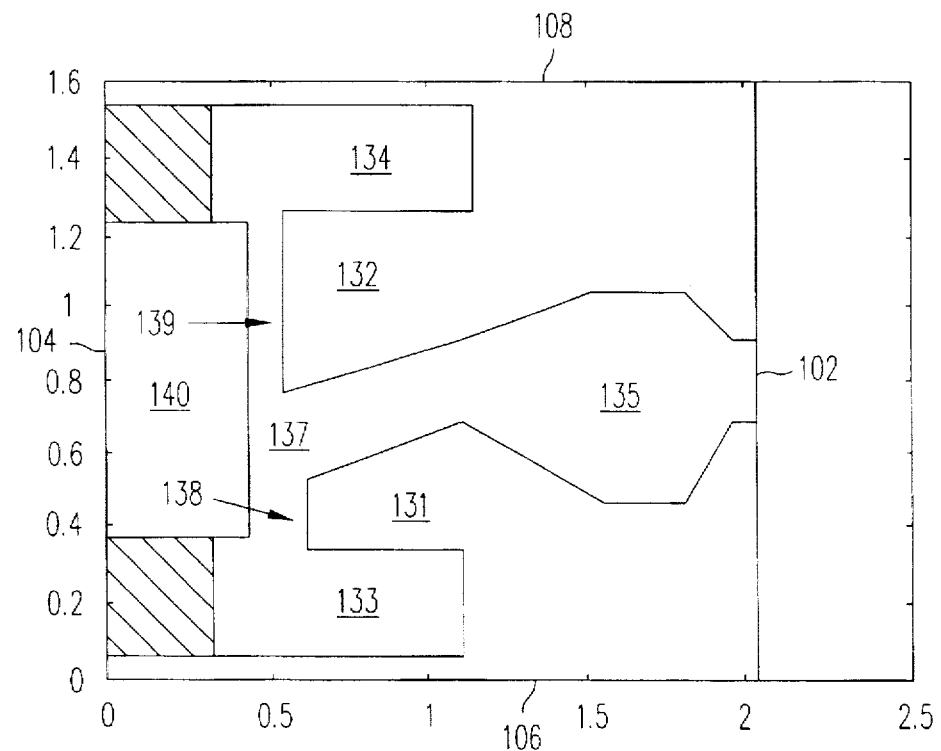
Figure 4C:
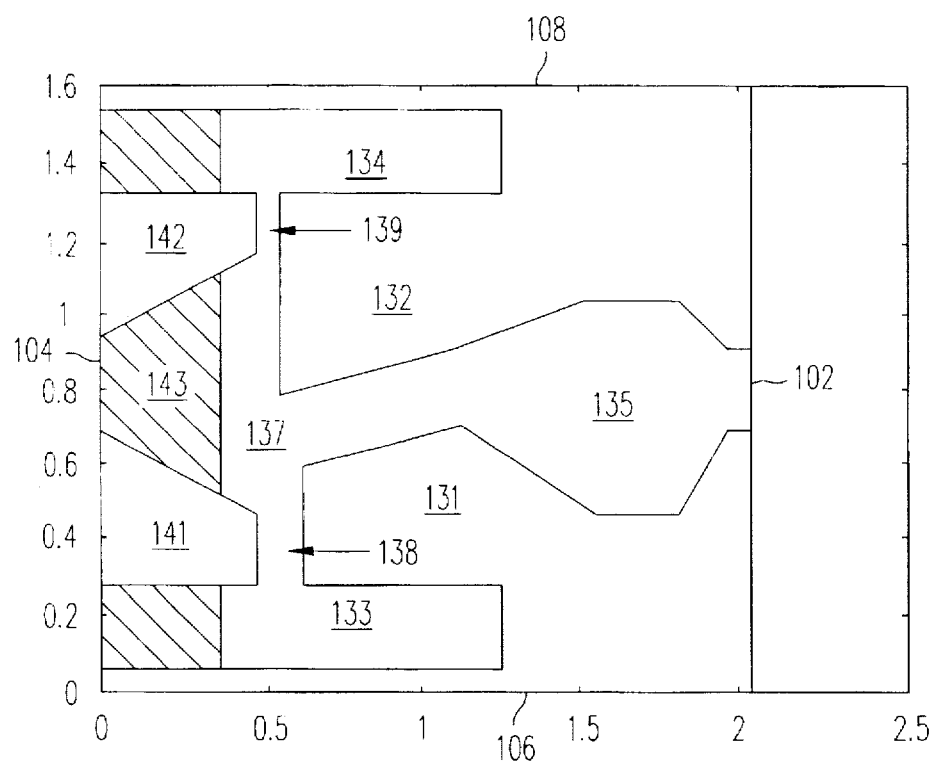

Three slider ABS configurations found to reduce roll in accordance with the present invention are shown in FIGS. 4A–4C. Referring first to FIG. 4A, a slider 36 is generally rectangular in shape, including a leading edge 104, a trailing edge 102, a hub side 106, and a rim side 108. For a typical disk drive with opposing sliders such as that shown in FIG. 1, the ABS configurations of some sliders are reversed from the patterns shown in FIGS. 4A–4C, 5A–5C and 6A–6C, as are the hub and rim sides.

The slider of FIG. 4A includes a pair of negative pressure pockets 131, 132 defined by side rails 133, 134, a cross rail 137, and an angled rail 135. The side rails 133, 134 extend from the leading edge 104 in the direction of the trailing edge 102, and preferably include a leading edge taper (indicated by hatching) for improved take-off performance. The angled rail 135 preferably extends from a non-central position on the cross rail 137 to the trailing end 102 and is angled relative to the longitudinal axis 145 of the slider to compensate for changes in air skew. Its trailing end portion may be centrally disposed as shown in FIG. 4A to accommodate a center-rail transducer configuration. Alternatively, it may be disposed to one side of the trailing end 102 to accommodate a side-rail transducer design. ABS shaping involves etching, laser ablation, ion milling, and/or other techniques which are generally known in the art. The angled rail 135 results in an asymmetric and biased ABS, since the majority of the positive pressure surfaces reside on the hub-side half of the surface, i.e. to the left of axis 145. Moreover, the rim-side negative pressure region 132 is substantially larger than the hub-side region 131 and generates a greater force toward the disk 44. At the ID, these characteristics result in negative roll similar to that shown in FIG. 3. But as the slider moves toward the OD in a rotary actuator disk drive, the skew angle increases and the positive pressure along angled rail 135 decreases. This results in positive roll at the OD.

The variation in roll between the ID and OD is referred to as a roll envelope. A useful measure of roll envelope is the difference between roll measured at the ID and roll measured at the OD, or $(R-H)_{ID} - (R-H)_{OD}$. The present invention seeks to reduce the roll envelope by providing more positive pressure at the OD to counteract loss of positive pressure on the angled rail 135 without negatively impacting performance at the ID. According to the principles of the present invention, the cross-rail 137 is shaped to have varying thicknesses to achieve this objective. Hub portion 138, disposed between side rail 133 and angled cross-rail 135, is wider than rim portion 139. For example, if the slider of FIG. 4A is a nanoslider having approximate dimensions of 2 mm length×1.5 mm width×0.425 mm thickness and an etch depth of about 5 microns, hub portion 138 is preferably on the order of 50 microns wider than the rim portion 139.

FIG. 4B shows the slider ABS of FIG. 4A modified to include a leading edge pocket 140. Leading edge pocket 140 reduces the negative pressure generated in regions 131 and 132 by channeling air into these regions for a flatter fly height profile. Again, the hub portion 138 of cross rail 137 is shaped to be wider than the rim portion 139.

Finally, FIG. 4C shows the ABS of FIG. 4B modified to include a debris-deflecting protrusion 143 extending from the cross rail 137 toward the leading edge through leading edge pocket 140. This protrusion 143 may be tapered and divides pocket 140 into a pair of cavities 141, 142. Its purpose is to reduce the volume of debris collected in the leading edge pocket 140. In addition, it prevents debris from accumulating at the slider's center, where it is more likely to become trapped under the transducer which is centrally positioned at the trailing end 102.

For the slider of FIG. 4A, utilization of the present invention resulted in a 3 nm improvement in the roll envelope. The ID fly height increased by 4.5 nm and the OD fly height decreased by 1 nm.

For a slider with the ABS design of FIG. 4B, the roll envelope was reduced by 4 nm, while the ID fly height was increased by 3.5 nm and the OD fly height was decreased by 1.5 nm.

Trident ABS configurations display more variations in roll from ID to OD than traditional tapered designs due to the increase in tapered regions. Thus reduction in roll envelope becomes particularly critical for such designs. The roll profile curve 68 of FIG. 3A was obtained from a nanoslider having an ABS design similar to that of FIG. 4C, but without the proposed variation in crossbar 135 thickness. This design had an average ID fly height of 62 nm, an average OD fly height of 48 nm, and was found to produce a roll envelope of 18 nm. In contrast, curve 66 corresponds to the air bearing design of FIG. 4C implementing the teachings herein. This design showed the most favorable results of the three configurations illustrated in FIGS. 4A–4C, having a roll envelope of 11 nm for a significant decrease of 7 nm. The ID fly height in this instance was increased by 3.5 nm, but was not considered critical to data density requirements. The OD fly height remained unchanged. However, the ID flying height may optionally be independently lowered without affecting the improvement in roll envelope, e.g. by varying the dimensions of rails 133, 134 and 135.

Figure 5A:
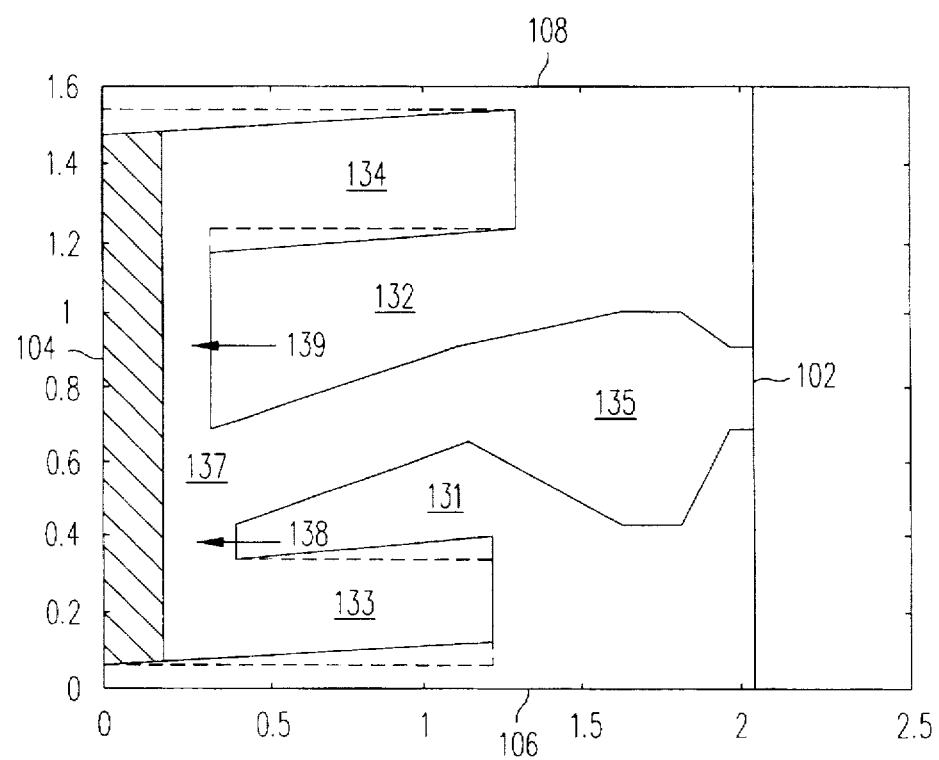
FIGS. 5A–5C are alternative configurations of air bearing sliders implementing the present invention.
Figure 5B:
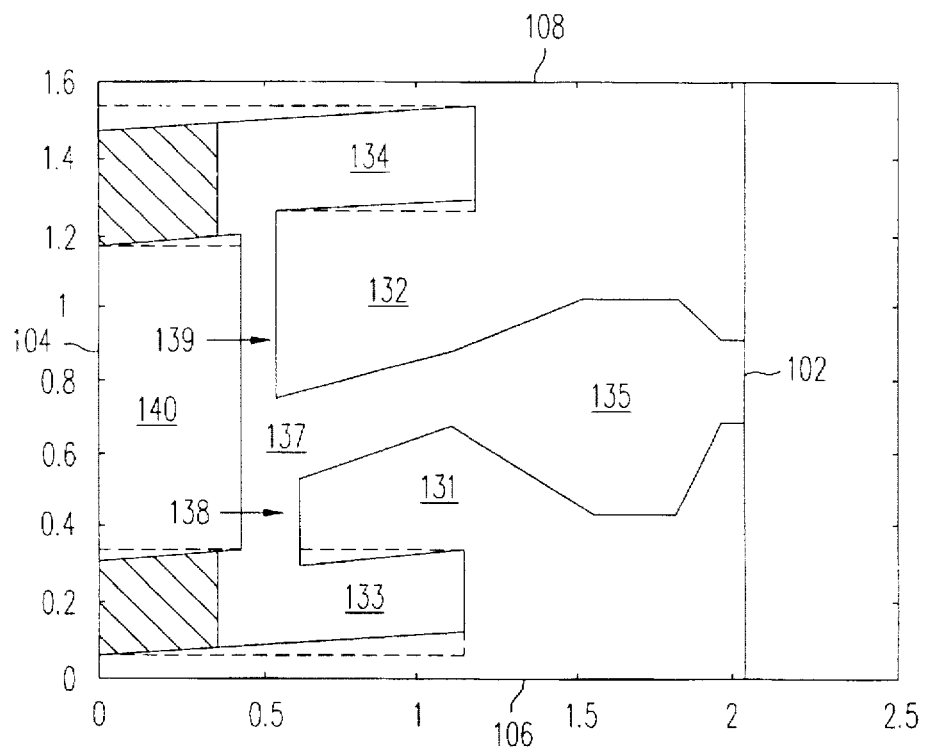
Figure 5C:
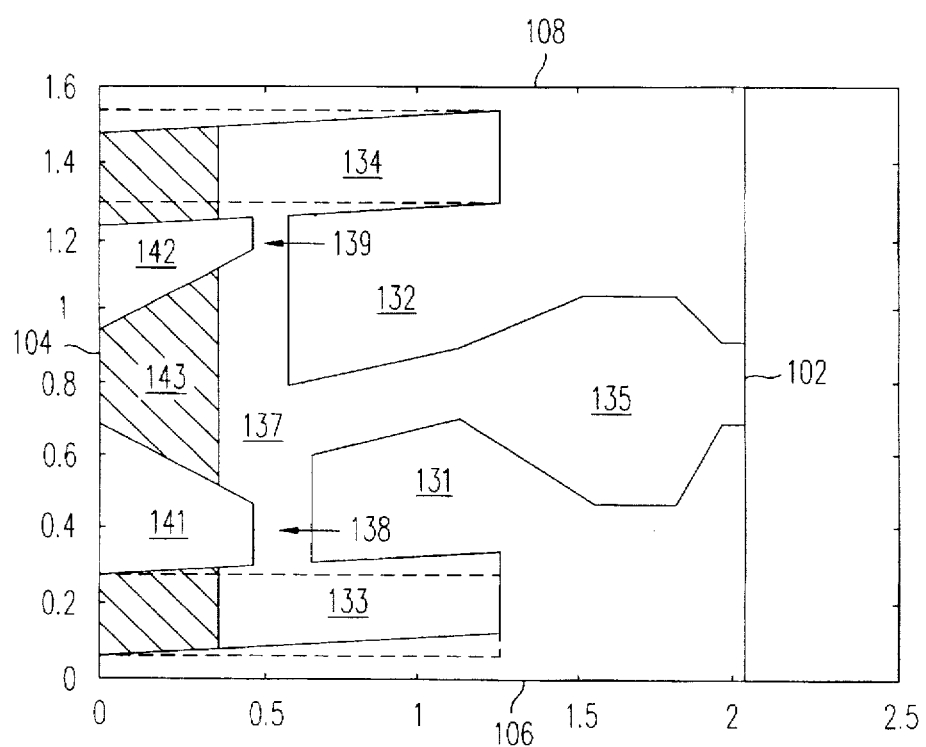
Figure 6A:
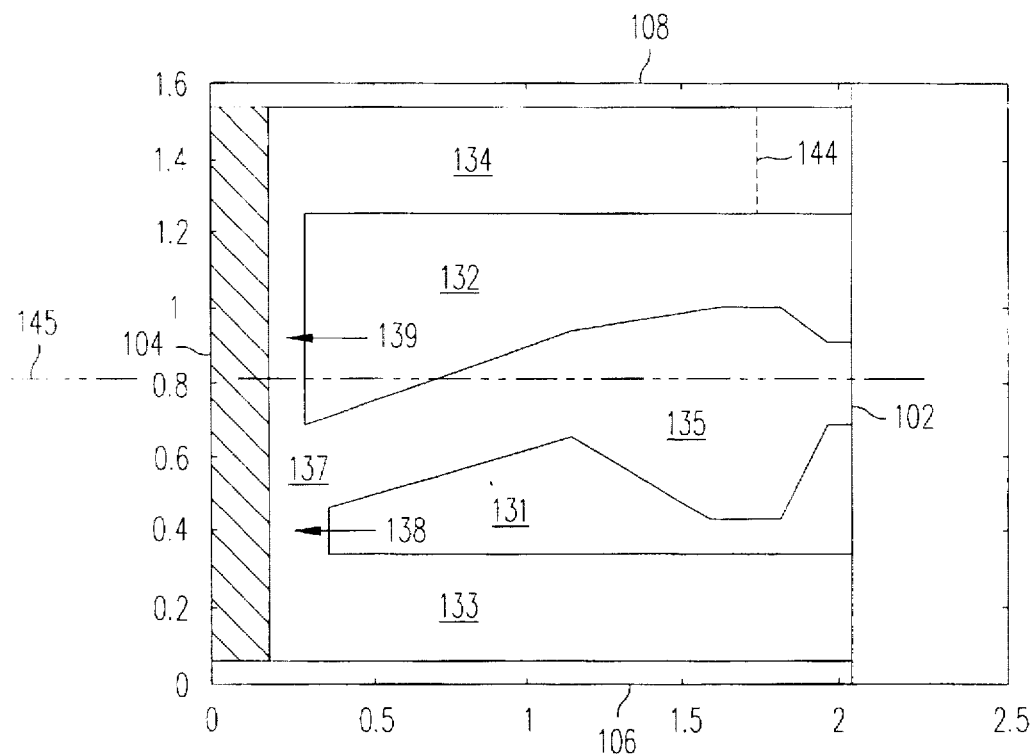
FIGS. 6A–6C are additional configurations of air bearing sliders implementing the present invention.
Figure 6B:
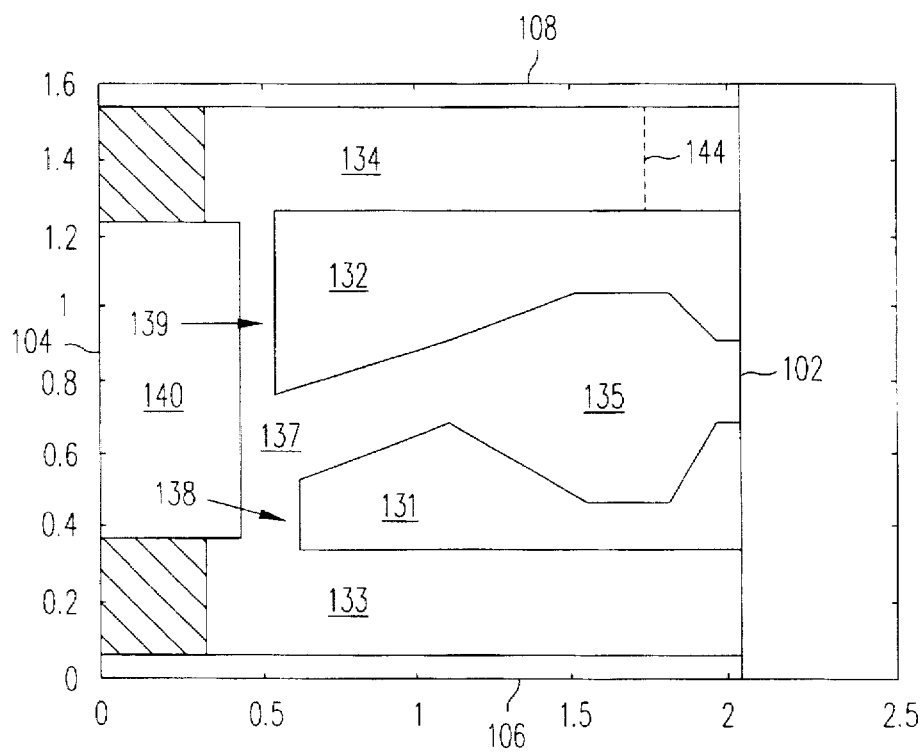
Figure 6C:
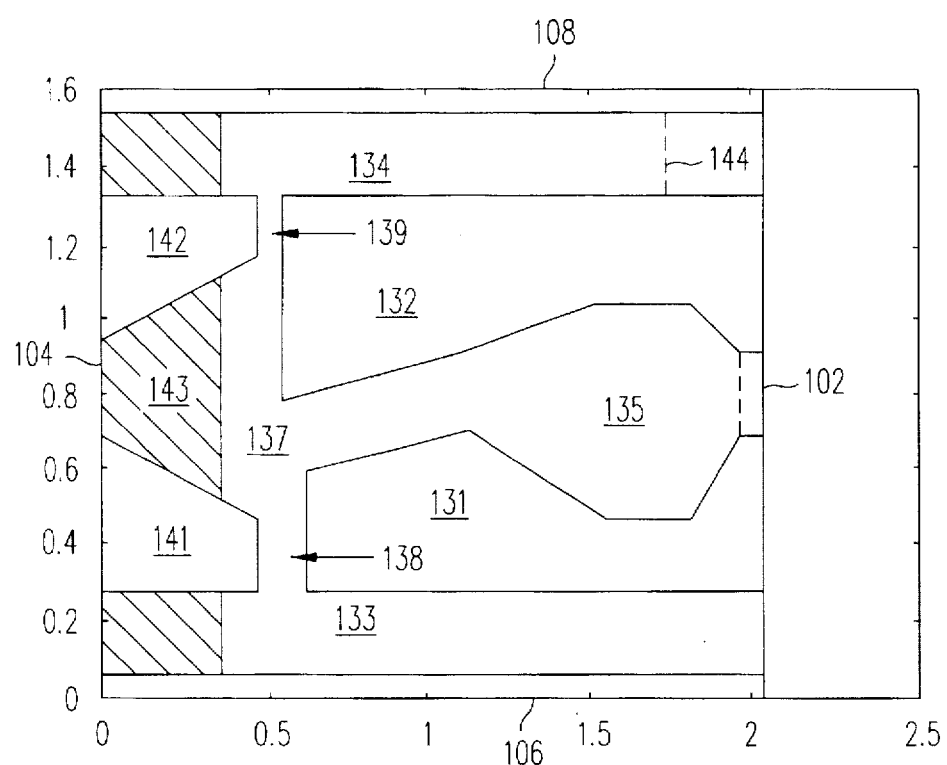

FIGS. 5A–5C and 6A–6C show alternative embodiments of the sliders shown in FIGS. 4A–4C. For example, FIGS. 5A–5C illustrate ABS designs having one or both side rails 133, 134 angled in addition to angled rail 135. These configurations are useful if it is desirable to further increase fly height at the ID. FIGS. 6A–6C depict ABS designs having two full-length side rails 133, 134, or one full length rail 133 and one shortened rail 134 (as indicated by the dashed line 144. A shortened side rail provides a roll insensitive ABS as fully disclosed in commonly assigned U.S. Pat. No. 5,396,386. This design is useful when a transducer must be provided on a siderail rather than, or in addition to, the centrally positioned transducer.

The present invention has been described with reference to the preceding embodiments. However, the fundamental concepts as taught in the present specification may be adapted to numerous ABS designs for a variety of storage device environments. Examples of alternative storage devices have been mentioned previously. In addition, sliders with alternative air bearing designs and/or nonrectangular shapes would benefit from the present invention if subjected to fluid flow. It should be apparent that other modifications and adaptations of the described embodiments may occur to one skilled in the art without departing from the scope of the present invention as set forth in the following claims.

We claim:

1. A slider comprising:
 a slider body having a leading edge, a trailing edge, first and second side edges and a lower surface; and
 an air bearing surface (ABS) formed on the lower surface and including a cross rail, first and second side rails, and an angled rail, the angled rail angled with respect to at least one side edge of the slider body, the first and second side rails and the angled rail extending from the cross rail toward the trailing edge to define a negative pressure region, the cross rail including a hub rail portion positioned between the first side rail and the angled rail and a rim rail portion positioned between the second side rail and the angled rail, wherein the hub rail portion is wider than the rim rail portion to reduce slider roll variation under changing skew conditions.

2. The slider of claim 1, wherein the angled rail extends from a non-central location of the cross rail.

3. The slider of claim 1, wherein the cross rail is disposed substantially adjacent to the leading edge.

4. The slider of claim 1, wherein the angled rail extends approximately to the center of the trailing edge.

5. The slider of claim 1, wherein the angled rail extends to one side of the trailing edge.

6. The slider of claim 1, wherein the cross rail includes a leading edge pocket formed substantially adjacent to the leading edge.

7. The slider of claim 6, wherein at least one side rail is angled with respect to at least one side edge of the slider body.

8. The slider of claim 6, wherein at least one side rail extends from the leading edge to the trailing edge.

9. The slider of claim 1, wherein the cross rail includes two leading edge pockets and a debris-deflecting portion, the two leading edge pockets positioned substantially adjacent to the leading edge and defining the debris-deflecting portion.

10. The slider of claim 9, wherein at least one side rail is angled with respect to at least one side edge of the slider body.

11. The slider of claim 9, wherein at least one side rail extends from the leading edge to the trailing edge.

12. The slider of claim 1, wherein at least one side rail extends from the leading edge to the trailing edge.

13. A storage device comprising:

a movable storage media;

a transducer;

a slider positioned to support the transducer, the slider comprising:
- a slider body having a leading edge, a trailing edge, first and second side edges and a lower surface; and
- an air bearing surface (ABS) formed on the lower surface and including a cross rail, first and second side rails, and an angled rail, the angled rail angled with respect to at least one side edge of the slider body, the first and second side rails and the angled rail extending from the cross rail toward the trailing edge to define a negative pressure region, the cross rail including a hub rail portion positioned between the first side rail and the angled rail and a rim rail portion positioned between the second side rail and the angled rail, wherein the hub rail portion is wider than the rim rail portion to reduce slider roll variation under changing skew conditions;

an actuator subsystem configured to position the transducer relative to the storage medium for reading or writing information thereon; and electronics operable to enable the transducer to read or write information on the storage medium and for processing the information read or written.

14. The storage device of claim 13, wherein the angled rail extends from a non-central location of the cross rail.

15. The storage device of claim 13, wherein the cross rail of the slider is disposed substantially adjacent to the leading edge.

16. The storage device of claim 13, wherein the angled rail of the slider extends approximately to the center of the trailing edge.

17. The storage device of claim 13, wherein the angled rail of the slider extends to one side of the trailing edge.

18. The storage device of claim 13, wherein the cross rail includes a leading edge pocket formed substantially adjacent to the leading edge.

19. The storage device of claim 13, wherein the cross rail includes two leading edge pockets and a debris-deflecting portion, the two leading edge pockets positioned substantially adjacent to the leading edge and defining the debris-deflecting portion.

20. The storage device of claim 13, wherein at least one side rail of the slider extends from the leading edge to the trailing edge.

21. An air bearing slider comprising:

a slider body having a leading edge, a trailing edge, hub side and rim side edges, and a lower surface comprising a positive pressure region and a negative pressure region, the positive pressure region formed by a cross rail, first and second side rails, and an angled rail positioned between first and second side rails and angled with respect to at least one side edge, the first and second side rails and the angled rail extending from the cross rail toward the trailing edge and defining said negative pressure region, wherein the positive pressure region is greater at the hub side half than the rim side half of the slider body to reduce slider roll variation under changing air skew conditions.

22. The slider of claim 21, wherein the negative pressure region is larger at the rim side half than the hub side half of the slider body.

23. The slider of claim 21, wherein the cross rail is disposed adjacent to the leading edge.

24. The slider of claim 21, wherein the angled rail extends from the cross rail to the center of the trailing edge.

25. The slider of claim 21, wherein the angled rail extends from the cross rail to one side of the trailing edge.

* * * * *